United States Patent
Aggarwal (10) Patent No.: US 10,135,723 B2
(45) Date of Patent: Nov. 20, 2018

(54) SYSTEM AND METHOD FOR SUPERVISED NETWORK CLUSTERING

(75) Inventor: Charu C. Aggarwal, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 247 days.

(21) Appl. No.: 13/610,092

(22) Filed: Sep. 11, 2012

(65) Prior Publication Data

US 2014/0047091 A1 Feb. 13, 2014

Related U.S. Application Data (63) Continuation of application No. 13/572,179, filed on Aug. 10, 2012.

(51) Int. Cl.
*H04L 12/715* (2013.01)

(52) U.S. Cl.
CPC .................................. *H04L 45/46* (2013.01)

(58) Field of Classification Search
None
See application file for complete search history.

(56) References Cited

U.S. PATENT DOCUMENTS

| | | | | |
|---|---|---|---|---|
| 5,444,796 A | * | 8/1995 | Ornstein | 382/157 |
| 5,561,768 A | | 10/1996 | Smith | |
| 5,857,169 A | * | 1/1999 | Seide | 704/256.7 |
| 6,556,983 B1 | * | 4/2003 | Altschuler et al. | 706/55 |
| 6,594,694 B1 | * | 7/2003 | Najork et al. | 709/219 |
| 7,333,998 B2 | * | 2/2008 | Heckerman et al. | |
| 7,603,327 B2 | | 10/2009 | Esfahany | |
| 7,809,704 B2 | | 10/2010 | Surendran et al. | |
| 7,840,662 B1 | | 11/2010 | Natanzon | |
| 7,937,264 B2 | * | 5/2011 | Burges et al. | 704/9 |
| 8,055,664 B2 | * | 11/2011 | Baluja et al. | 707/749 |
| 8,108,413 B2 | | 1/2012 | Kar et al. | |
| 8,359,238 B1 | * | 1/2013 | Kauchak et al. | 705/14.66 |

(Continued)

FOREIGN PATENT DOCUMENTS

| EP | 1500287 | 1/2005 |
|---|---|---|
| WO | WO 2011091958 A1 | 1/2011 |

OTHER PUBLICATIONS

Ramabhadran, Sriram, et al. "Prefix hash tree: An indexing data structure over distributed hash tables." Proceedings of the 23rd ACM symposium on principles of distributed computing. vol. 37. 2004.*

(Continued)

*Primary Examiner* — Scott B Christensen
*Assistant Examiner* — Lam T Do
(74) *Attorney, Agent, or Firm* — Kurt P. Goudy, Esq.; McGinn IP Law Group, PLLC (57) ABSTRACT

A method (and system) for supervised network clustering includes receiving and reading node labels from a plurality of nodes on a network, as executed by a processor on a computer having access to the network, the network defined as a group of entities interconnected by links. The node labels are used to define densities associated with the nodes. Node components are extracted from the network, based on using thresholds on densities. Smaller components having a size below a user-defined threshold are merged.

13 Claims, 8 Drawing Sheets

(56) References Cited

U.S. PATENT DOCUMENTS

| | | | |
|---|---|---|---|
| 8,423,538 B1* | 4/2013 | Sadikov et al. | 707/722 |
| 8,438,189 B2* | 5/2013 | Andersen et al. | 707/800 |
| 8,533,134 B1* | 9/2013 | Zhao et al. | 706/12 |
| 8,942,993 B2* | 1/2015 | Tunguz-Zawislak et al. | 705/14.66 |
| 2003/0202465 A1 | 10/2003 | Cain | |
| 2007/0162473 A1* | 7/2007 | Hadzikadic et al. | 707/100 |
| 2007/0239694 A1* | 10/2007 | Singh et al. | 707/3 |
| 2009/0083222 A1* | 3/2009 | Craswell et al. | 707/3 |
| 2009/0089285 A1* | 4/2009 | Donato et al. | 707/6 |
| 2009/0313286 A1* | 12/2009 | Mishra et al. | 707/102 |
| 2011/0029519 A1* | 2/2011 | Walther | G06F 17/30705 707/737 |
| 2011/0289025 A1* | 11/2011 | Yan | G06N 99/005 706/12 |
| 2011/0295845 A1* | 12/2011 | Gao et al. | 707/723 |
| 2012/0310966 A1* | 12/2012 | Kumar | 707/767 |

OTHER PUBLICATIONS

Garcia-Luna-Aceves, J. J., and Dhananjay Sampath. "Scalable integrated routing using prefix labels and distributed hash tables for MANETs." Mobile Adhoc and Sensor Systems, 2009. MASS'09. IEEE 6th International Conference on. IEEE, 2009.*

Tong, Hanghang, Christos Faloutsos, and Jia-Yu Pan. "Fast random walk with restart and its applications." (2006).*

Chawathe, Yatin, et al. "A case study in building layered DHT applications." ACM SIGCOMM Computer Communication Review 35.4 (2005): 97-108.*

Stoica, Ion, et al. "Chord: A scalable peer-to-peer lookup service for internet applications." ACM SIGCOMM Computer Communication Review. vol. 31. No. 4. ACM, 2001.*

Ramabhadran, Sriram, et al. "Brief announcement: prefix hash tree." Proceedings of the twenty-third annual ACM symposium on Principles of distributed computing. ACM, 2004.*

Eick, Christoph F., Nidal Zeidat, and Zhenghong Zhao. "Supervised clustering-algorithms and benefits." Tools with Artificial Intelligence, 2004. ICTAI 2004. 16th IEEE International Conference on. IEEE, 2004.*

Frey, Brendan J., and Delbert Dueck. "Clustering by passing messages between data points." science 315.5814 (2007): 972-976. www.psi.toronto.edu/affinitypropagation/FreyDueckScience07.pdf.*

Zeng, Hua-Jun, et al. "Learning to cluster web search results." Proceedings of the 27th annual international ACM SIGIR conference on Research and development in information retrieval. ACM, 2004.*

Xiao, Jitian, et al. "Measuring similarity of interests for clustering web-users." Proceedings of the 12th Australasian database conference. IEEE Computer Society, 2001.*

Wen, Ji-Rong, Jian-Yun Nie, and Hong-Jiang Zhang. "Query clustering using user logs." ACM Transactions on Information Systems 20.1 (2002): 59-81.*

Kleinberg, Jon M. "Authoritative sources in a hyperlinked environment." Journal of the ACM (JACM) 46.5 (1999): 604-632.*

Xing, Eric P., et al. "Distance metric learning with application to clustering with side-information." Advances in neural information processing systems. 2002.*

Jing, Yushi, and Shumeet Baluja. "Visualrank: Applying pagerank to large-scale image search." Pattern Analysis and Machine Intelligence, IEEE Transactions on 30.11 (2008): 1877-1890.*

Bar-YossefY, Ziv, et al. "Approximating aggregate queries about web pages via random walks." (2000).*

Bijral, Avleen S., Nathan Ratliff, and Nathan Srebro. "Semi-supervised learning with density based distances." arXiv preprint arXiv:1202.3702 (2012).*

Orlitsky, Alon. "Estimating and computing density based distance metrics." Proceedings of the 22nd international conference on Machine learning. ACM, 2005.*

Wang, Ling, Liefeng Bo, and Licheng Jiao. "A modified K-means clustering with a density-sensitive distance metric." Rough Sets and Knowledge Technology. Springer Berlin Heidelberg, 2006. 544-551.*

Graham, Fan Chung, and Alexander Tsiatas. "Finding and visualizing graph clusters using pagerank optimization." Algorithms and Models for the Web-Graph. Springer Berlin Heidelberg, 2010. 86-97.*

Backstrom, Lars, and Jure Leskovec. "Supervised random walks: predicting and recommending links in social networks." Proceedings of the fourth ACM international conference on Web search and data mining. ACM, 2011.*

Rycroft, C. H., and M. Z. Bazant. "Lecture 1: Introduction to Random Walks and Diffusion." Thecnical Report, Department of Mathematics—MIT 2 (2005).*

Kim, Min-Soo, and Jiawei Han. "A particle-and-density based evolutionary clustering method for dynamic networks." Proceedings of the VLDB Endowment 2.1 (2009): 622-633.*

Harel, David, and Yehuda Koren. "On clustering using random walks." FST TCS 2001: Foundations of Software Technology and Theoretical Computer Science. Springer Berlin Heidelberg, 2001. 18-41.*

Pons, Pascal, and Matthieu Latapy. "Computing communities in large networks using random walks." Computer and Information Sciences—ISCIS 2005. Springer Berlin Heidelberg, 2005. 284-293.*

Aggarwal, Charu C.; Wang, Haixun et al. "Managing and Mining Graph Data;" Advances in Databasse Systems vol. 40 2010 http://link.springer.com/book/10.1007/978-1-4419-6045-0.*

El-Yaniv, Ran; Souroujon, Oren, "Iterative Double Clustering for Unsupervised and Semi-supervised Learning;" Machine Learning ECML 2001 vol. 2167; Aug. 30, 2001 http://link.springer.com/book/10.1007/978-1-4419-6045-0.*

Denton, Anna, "Kernel-Density-Based Clustering of Time Series Subseequences Using a Continuous Random-Walk Noise Model;" Nov. 27, 2005 http://ieeexplore.ieee.org/document/1565670/?arnumber=1565670&tag=1.*

Ester, Martin; Kriegel, Hans-Peter; Sander, Jorg; Xu, Xiaowei; "A Density-Based Algorithm for Discovering Clusters in Large Spatial Databases with Noise" 1996 http://www.aaai.org/Papers/KDD/1996/KDD96-037.*

Jin et al., "Large-Scale QoS-Aware Service-Oriented Networking with a Clustering-Based Approach," Proceedings of 16th international Conference on Computer Communications and Networks, 2007.

Liu et al., "An algorithm of node collection in Distributed File System based on mathematical expectation," 2010 International Conference on Computer Application and System Modeling (ICCASM 2010).

Ramaswamy et al., "A Distributed Approach to Node Clustering in Decentralized Peer-to-Peer Networks," IEEE Transactions on Parallel and Distributed Systems, vol. 16, No. 9, Sep. 2005.

Brin, et al., "The Anatomy of a Large-Scale Hypertextual we Search Engine", www.conference, 1998, pp. 1-19.

United States Office Action dated Jul. 14, 2014 in U.S. Appl. No. 13/572,179.

United States Office Action dated Jan. 30, 2015 in U.S. Appl. No. 13/572,179.

United States Office Action dated Nov. 3, 2015 in U.S. Appl. No. 13/572,179.

United States Office Action dated May 6, 2016 in U.S. Appl. No. 13/572,179.

United States Office Action dated Nov. 2, 2016 in U.S. Appl. No. 13/572,179.

"How Computers Work: The CPU and Memory" Dec. 15, 2003, http://web.archive.org/web/20031215230244/http://homepage.cs.uri.edu/facility/wolfe/book/Readings/Reading04.htm.

United States Office Action dated Apr. 27, 2017 in U.S. Appl. No. 13/572,179.

* cited by examiner

SYSTEM AND METHOD FOR SUPERVISED NETWORK CLUSTERING

This application is a Continuation Application of U.S. patent application Ser. No. 13/572,179, filed on Aug. 10, 2012.

BACKGROUND OF THE INVENTION

Field of the Invention

The present invention relates generally to mining and learning network data. More specifically, the present invention describes methods and systems for supervised network clustering using densities associated with nodes and extracting node components from the network, based on using thresholds on densities.

Description of the Related Art

Network data has become increasingly popular, because of the increasing proliferation of social and information networks. A significant amount of research has been devoted to the problem of mining and learning network data. In many scenarios, a subset of the nodes in the network may have labels associated with them, and this information can be effectively used for a variety of clustering and classification applications.

In the context of the present invention, a network generally refers to a group of entities connected by links. This is a useful abstraction for many real-world scenarios, such as computer routers, pages on a website, or the participants in a social network. The nodes refer to the individual entities (e.g., routers, pages, participants) which are connected by links, which could either be communication links, hyperlinks, or social network friendship links.

The useful properties of such nodes can be captured by labels, which are essentially drawn from a small set of keywords describing the node. For example, in a social network of researchers, the label on the node could correspond to their topic area of interest. Such labels can provide useful background knowledge for a variety of applications, including directing a clustering process in different ways, depending upon the nature of the underlying application.

On the other hand, the available labels may often be noisy, incomplete, and are often partially derived from unreliable data sources. Many of the underlying clusters in the network may also not be fully described from such information, and even when the labels for a particular kind of desired category are available, they may represent an extremely small subset of the nodes. Nevertheless, such noisy, sparse, and incomplete information can also be useful in some parts of the network, and should therefore not be ignored during clustering.

SUMMARY OF THE INVENTION

In view of the foregoing and other exemplary problems, drawbacks, and disadvantages of the conventional methods and systems, an exemplary feature of the present invention is to provide a new method and structure for supervised network clustering.

Another exemplary feature of the present invention is to provide a highly adaptive network clustering algorithm.

Another exemplary feature of the present invention is to provide an approach for constraining the nodes to belong to specific clusters, which is particularly useful in cases where prior knowledge is available for directing the clustering process.

In a first exemplary aspect of the present invention, described herein is a method for supervised network clustering, including receiving and reading node labels from a plurality of nodes on a network, the network being defined as a group of entities interconnected by links; using the node labels to define densities associated with the nodes; extracting node components from the network, based on using thresholds on densities; and merging smaller components having a size below a user-defined threshold.

In a second exemplary aspect of the present invention, also described herein is a method of clustering, including receiving and reading node labels from a plurality of nodes on a network, as executed by a processor on a computer having access to the network, the network defined by a group of entities connected by links; calculating a random-walk-based probability for each node on the network, to define densities associated with the nodes; and defining clusters of nodes in the network based on the densities.

In a third exemplary aspect of the present invention, also described herein is a method of clustering, including calculating a density associated with a plurality of nodes on a network, as executed by a processor on a computer having access to the network, the network defined by a group of entities connected by links; and defining clusters of nodes in the network based on the densities.

In a fourth exemplary aspect, also described herein is an apparatus, including a processor, and a memory device, the memory device storing therein a set of machine-readable instructions permitting the processor to execute a method of supervised network clustering, the method including receiving and reading node labels from a plurality of nodes on a network, as executed by a processor on a computer having access to the network; using the node labels to define densities associated with the nodes, extracting node components from the network, based on using thresholds on densities, and merging smaller components having a size below a user-defined threshold.

In a fifth exemplary aspect, also described herein is a server including an input port to receive information concerning nodes on a network and a processor, wherein the processor receives, via the input port, and reads node labels from a plurality of nodes on the network, the network defined by a group of entities connected by links, calculates a random-walk-based probability for each node on the network, to define densities associated with the nodes, and defines clusters of nodes in the network based on the densities.

In a sixth exemplary aspect, also described herein is a computer including a processor; and a memory device, the memory device storing a set of computer-readable instructions for the CPU to execute a method of clustering, the method including calculating a density associated with each of a plurality of nodes on a network, as executed by a processor on a computer having access to the network, the network defined by a group of entities connected by links, and defining clusters of nodes in the network based on the densities.

Other aspects, features and advantages of the invention will be more fully apparent from the ensuing disclosure and appended claims.

These and other advantages may be achieved with the present invention.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF AN EXEMPLARY EMBODIMENT OF THE INVENTION

The learning process for a network, as meaning in the context of the present invention a group of entities interconnected by links, can take on many forms, depending on the level of supervision in the learning process:

At one end of the spectrum, no supervision may be available in the form of node labels. This problem is equivalent to the unsupervised network clustering problem.

In many cases, some labels may be available at the nodes, which provide the partial supervision necessary for the clustering process. However, many other node clusters may also exist, which are not necessarily related to the labels on the nodes. This problem has remained largely unexplored for the case of structural data. The other end of the spectrum consists of the fully supervised learning or collective classification scenario, in which all the unlabeled nodes need to be classified, based on the current pattern of labeling of a small subset of the nodes.

For a given network application, the most suitable level of supervision may depend upon the underlying data and the task at hand. In most scenarios involving very large networks, a plethora of partial labels may be available in order to supervise the cluster creation process. Some examples are as follows:

In a scientific community network, it may be possible to label a small subset of nodes, depending upon the area of interest of the particular academic.

In a movie information network such as the Internet Movie Database (IMDb), containing both movies and actors, the genre of the movie may be labeled, whereas the pre-dominant genre of an actor may not be available. This information can be used to direct the clustering process towards a scenario in which actors are clustered together not just by their linkage to one another, but also by their similarity in terms of the genre of the movie in which they may act.

In a social network application, it may be desirable to cluster actor nodes based on their affinity to some set of products. While such labels may not be known across all the nodes, they may be available for some small subset of the nodes.

Furthermore, the social network for a given user may be defined in a variety of ways, depending upon their professional contacts, family, school, or alma-mater contacts. Interesting information about the user (such as their school info) could be considered labels. These different communities of the same user are often quite different from one another and represent different segments of the user social life. The supervision process can help in focusing the community detection approach in a particular direction.

It is clear that such labels can be very useful for directing the clustering process in different ways, depending upon the nature of the underlying application. On the other hand, the available labels may often be noisy, incomplete, and are often partially derived from unreliable data sources. Many of the underlying clusters in the network may also not be fully described from such information, and even when the labels for a particular kind of desired category are available, they may represent an extremely small subset of the nodes. Nevertheless, such noisy, sparse, and incomplete information can also be useful in some parts of the network, and should therefore not be ignored during clustering.

In contrast, the present invention addresses these issues by providing a fully adaptive approach, in which the level of supervision for network clustering can be controlled adaptively depending upon the application at hand. The two extreme versions of this scheme can perform either purely unsupervised clustering or fully supervised collective classification.

One challenge which has recently been observed with network clustering is that different regions of the data have different levels of density in the network, as a result of which homogeneous clustering algorithms tend to create unusually large and incoherent clusters containing a significant percentage of the nodes from the network. This means that the link densities in different regions of the social network may be quite different. In such a scenario, the use of global analysis can either construct very small communities in sparse local regions, or report large and incoherent communities in dense regions. Therefore, it is important to use local structural analysis for determining the relevance of communities in a social network. Furthermore, the topological shape of the clusters in a graph may be arbitrary, and is not necessarily spherical, as is implied by distance-based clustering algorithms in networks.

The present invention demonstrates a density-based approach, which is able to satisfy both goals. Thus, it provides a highly adaptive network clustering algorithm, which can discover clusters of varying shape and density, and also incorporate different levels of supervision in the clustering process.

Referring now to the drawings, and more particularly to FIGS. 1-8, exemplary embodiments of the method and structures of the present invention are explained.

Initially, a summary of the present invention on supervised network clustering is provided, including a discussion of how a density-based model can be used for supervised network clustering. In this discussion, an undirected network $G=(N, A)$ is assumed, in which N is the set of nodes, and A is the set of edges. It is assumed that the number of nodes in N is n. In many applications, the edges in the network may be associated with a weight, which indicates the strength of the relationship.

We further assume that the weight of edge (i,j) is denoted by $w_{ij}$. For example, in an author-relationship network, the weights might represent the number of papers authored by a pair of individuals. In many network applications, the weight $w_{ij}$ is assumed to be 1, though the present invention allows the use of a weight for greater generality, if needed. It is assumed that the subset $N\_s$ of nodes are labeled, and that there are 1 different labels denoted by $\{1 \ldots 1\}$. Therefore, all nodes in $N\_s$ are labeled with one of the values drawn from $\{1 \ldots 1\}$, whereas the remaining nodes (i.e., in $N-N\_s$) are unlabeled.

An exemplary goal of the present invention is to partition the nodes in $N$ into $k$ different sets of nodes $C\_1 \ldots C\_k$ (i.e., clusters). In addition, we have a set of small subgraphs O which are referred to as the outlier set. Thus, we have $N=C\_1 \cup C\_2 \cup \ldots \cup C\_k \cup O$. We note that the labeling of the set of nodes in $N\_s$ can be used to supervise the creation of the clusters $C\_1 \ldots C\_k$ at a variety of different levels depending upon the application at hand. For a given node i, we assume that the edges incident on it are denote by I(i).

An exemplary overall idea of the supervised clustering approach of the present invention is to design a density-based method in which clusters are defined in terms of density-connected sets of nodes. A density-connected pair of nodes is one in which a path of nodes exists between the pair, such that each node has density above a pre-defined threshold. One natural advantage of density-based methods is that they are not restricted to particular topological shapes of the clusters, as are implied by distance-based methods. On the other hand, the concept of density is much more challenging to define in the context of structural data.

The density at a node is defined in terms of random walk probabilities. A more intuitive way of understanding the clustering process is in the context of a page-rank style random-walk process in which a surfer traverses the different nodes in the network by randomly picking any neighbor of a node during the walk. The page-rank random-walk concept has been used in the Google search engine and is described in more detail below. The density of a node, as used in the present invention, is essentially defined in an identical way to the page-rank computation.

Specifically, the density of a node i is defined as the steady-state probability that a random surfer on the network with a pre-defined set of reset probabilities visits node $i$ at any given transition. Intuitively, a random surfer on the network (upon entering a cluster), tends to get trapped in the cluster because the nodes in this dense region tend to have much higher visit probability than the surrounding nodes with lower visit probability. Therefore, a natural way of demarcating the boundaries of this cluster would be to exclude nodes from the cluster for which the density is below a given threshold, and then considering only connected regions of these high density nodes as candidates for a cluster.

Before discussing the clustering process in more detail, we will introduce the fundamentals of random-walk computation. In the random-walk process, at any given step, the random surfer either transitions to any node j adjacent to i with probability proportional to $p_{ij}=w_{ij}/\sum_{j \in I(i)} w_{ij}$, or it resets to a random node in the network with probability bias vector (or personalization vector) $\gamma$. Thus, the conditional probability of transition to node i (in case of a reset) is denoted by gamma(i). By picking the value of gamma(i) to be consistent with the different class labels, it is possible to perform the supervision process effectively.

Figure 1:
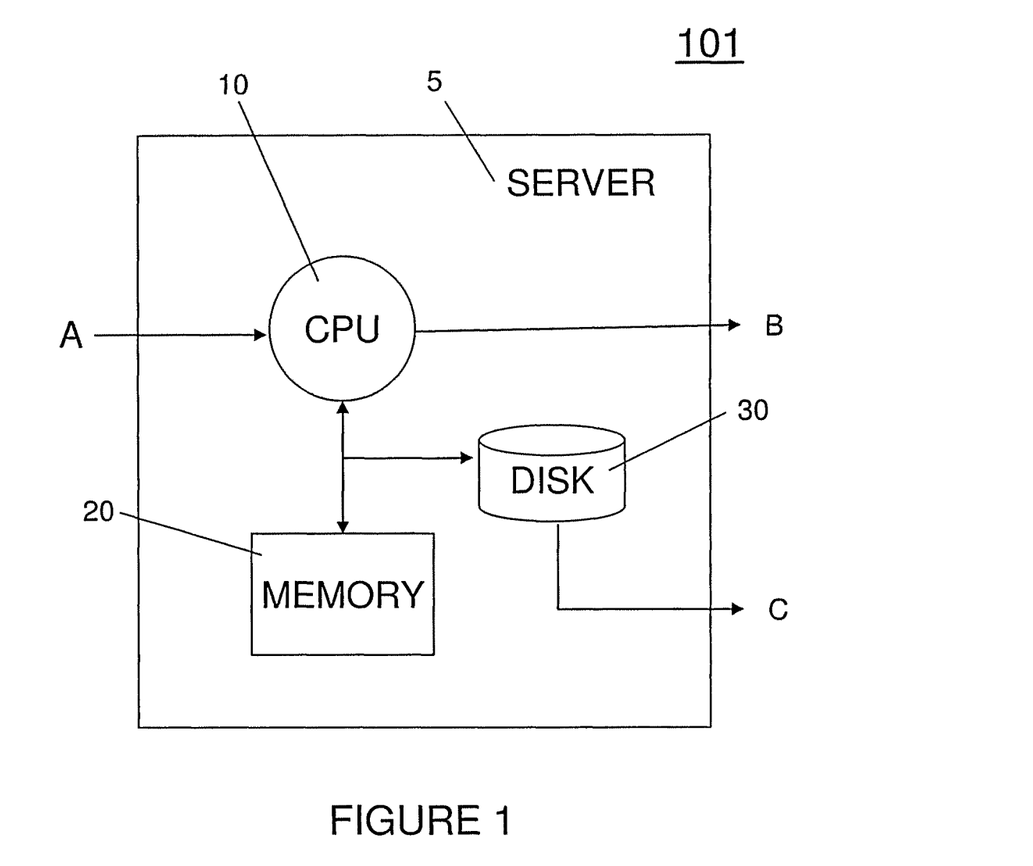
FIG. 1 is a detailed description of the architecture 100 of an exemplary embodiment of the present invention.

FIG. 1 is a detailed description of the architecture for the present invention. It is assumed that the processing is performed on a server 5 which contains a CPU 10, disk 30 and main memory 20. While other components may also be available on such a system, these particular components are necessary, in one exemplary embodiment of the present invention, for enabling the effective operation of the system. The graph is stored on the server end, along with the intermediate training data, which can be stored either on the disk 30 or main memory 20.

Figure 2:
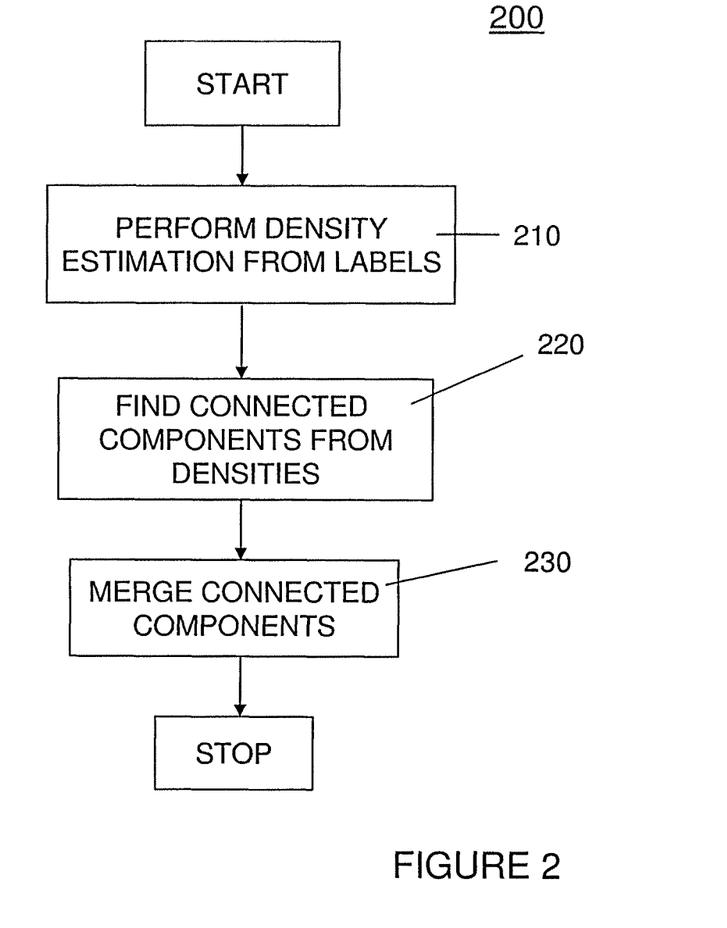
FIG. 2 is a detailed description in flowchart format 200 of the process for performing the supervised network clustering of an exemplary embodiment.

The CPU processes the graph continuously over time, and uses the main memory 20, for intermediate book keeping of the statistics. These statistics may eventually be sometimes stored on the disk. The clustering of the stream, as discussed in FIG. 2, is also performed on the CPU. Input A refers to the user inputs for labels for clustering. Output B refers to the output of clustering, and output C refers to the network stored on the disk 30. The input to the clustering process is the nodes, links, and labels. The output is the grouping of the nodes into labels.

FIG. 2 is description of the overall clustering process. The overall clustering process consists of three components. The first component is that of estimating the densities of the different nodes. The densities can be estimated in terms of the random walk probabilities. The second step is to separate out the different connected components based on these density values. Once these connected components have been found, we merge the smaller connected components into larger ones in order to provide each cluster with a critical mass.

The first step of density estimation is performed in step 210. This step is performed with the use of the labels from the underlying data. The labels provide help in supervising the density estimation process. This step will be discussed in detail in FIG. 5.

The next step is to find connected components from these densities. This is performed in step 220 in FIG. 2. This step is described in detail in FIG. 3.

Finally in step 230, the smaller connected components are merged, in order to create the larger clusters from the underlying network.

Figure 3:
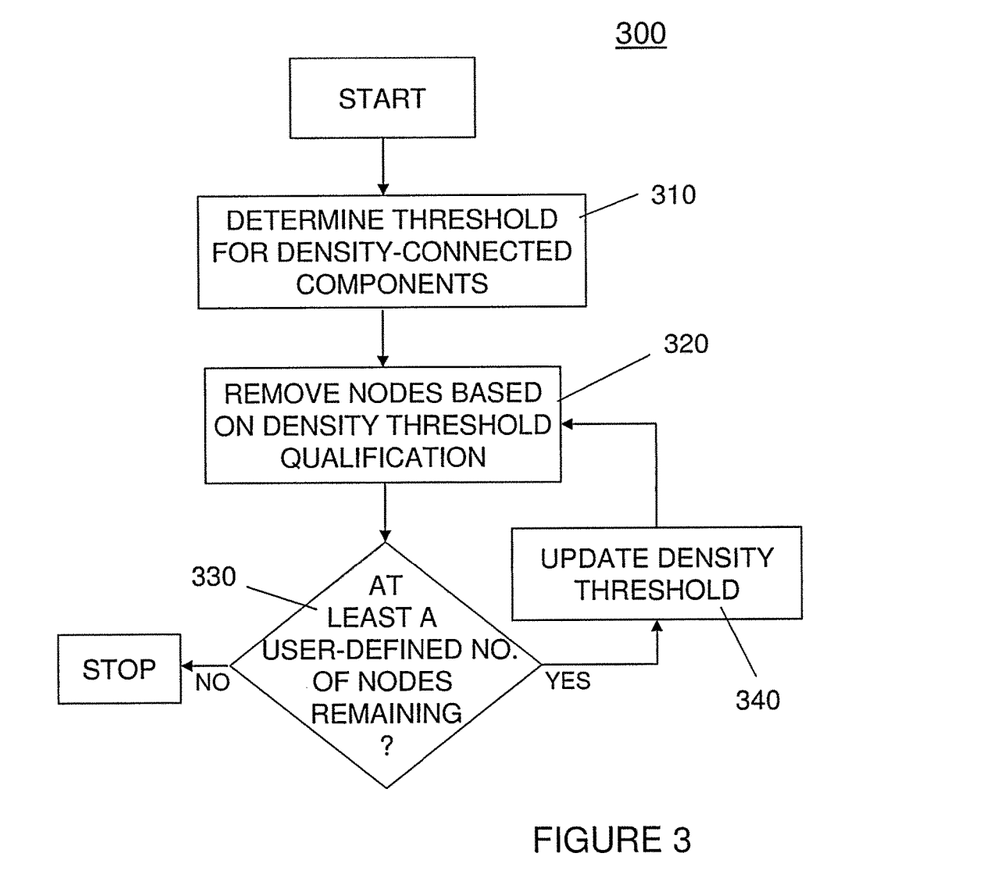
FIG. 3 is a detailed description in flowchart format 300 of determining the density connected components from the densities, as an exemplary detailed description of step 220 of FIG. 2.

FIG. 3 is a description of the process of determining the density connected components from the network, once the densities have already been estimated. It can be considered a detailed description of step 220 of FIG. 2. The major challenge in performing the density estimation process is that the densities of different nodes are quite different, and a single threshold cannot be used to remove all the components.

Therefore, in one exemplary embodiment, our approach generates the different thresholds in an iterative process. In order to generate the threshold for the density connected components, we use the average density over all the nodes as a threshold for the estimation process. In step 320, we remove all the nodes in the network based on this density-threshold qualification. The removal of these nodes reduces the number of remaining nodes in the network. In step 330, we check if a sufficient number of nodes are still remaining in the network. If this is indeed the case, then we update the density threshold in step 340. This updated density threshold is the density across the remaining nodes in the network. After updating the density threshold, we remove the nodes based on the density threshold qualification, and go back to step 320. This process is continually repeated, until the remaining network does not contain a sufficient number of nodes.

Figure 4:
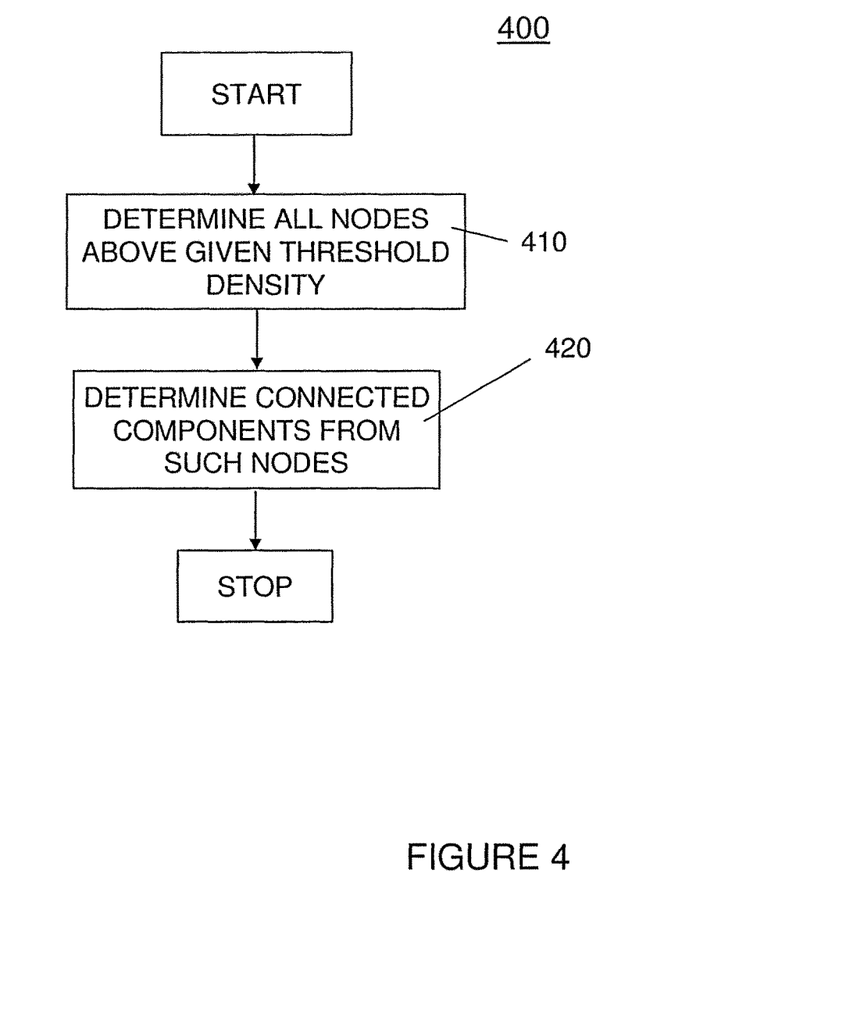
FIG. 4 is a detailed description in flowchart format 400 of the process of separating out a connected component for a density threshold of a specific value, as an exemplary detailed description of step 320 of FIG. 3.

FIG. 4 is a description of how the nodes are removed, based on the use of a specific density threshold. The first step is determining all the nodes in the network for which the density is above this threshold. This step is described by block 410 of FIG. 4. This new set of nodes induces a much smaller subgraph of the original network. This smaller subgraph is typically disconnected into smaller portions, which are dense regions of the data. These connected components are reported as the smaller clusters determined in this step. The remaining network is then processed again for removal of nodes after updating the threshold, as described in FIG. 3.

Figure 5:
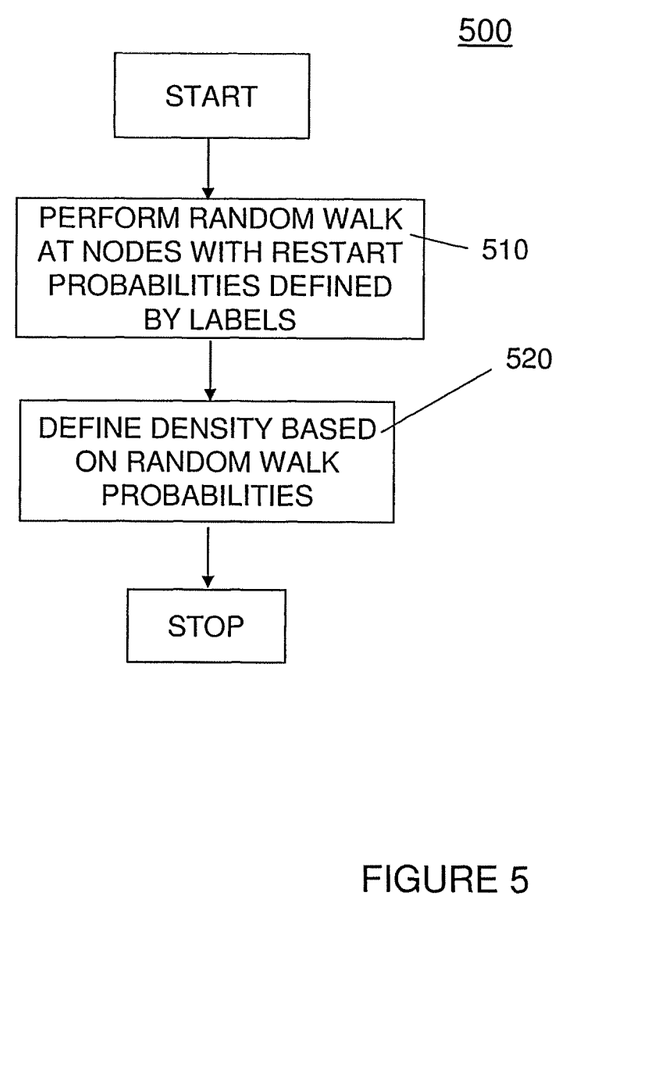
FIG. 5 is a detailed description in flowchart format 500 of the process for performing the density estimation, as an exemplary detailed description of step 210 of FIG. 2.

FIG. 5 is a detailed description of the process of performing the density stimulation from the nodes and labels. It can be considered a detailed description of step 210 of FIG. 2. The first step is to perform random walks in the network with restart probabilities defined by the node labels. For example, when the labels are of a particular class only, we can set the restart only at nodes which are labeled by that class. This is performed in step 510. In step 520, we perform the density estimation with the use of the random walk probabilities from this process. The process of calculating the random-walk-based probabilities, used in the present invention as the basis for calculating clusters, is discussed in the prior art in S. Brin, "The anatomy of a large-scale hypertextual search engine", WWW Conference, 1998, the contents of which are incorporated herein by reference.

This paper describes the PageRank algorithm of the Google search engine, described in this paper by its two cofounders, as follows:

"2.1 PageRank: Bringing Order to the Web

The citation (link) graph of the web is an important resource that has largely gone unused in existing web search engines. We have created maps containing as many as 518 million of these hyperlinks, a significant sample of the total. These maps allow rapid calculation of a web page's "PageRank", an objective measure of its citation importance that corresponds well with people's subjective idea of importance. Because of this correspondence, PageRank is an excellent way to prioritize the results of web keyword searches. For most popular subjects, a simple text matching search that is restricted to web page titles performs admirably when PageRank prioritizes the results (demo available at google.stanford.edu). For the type of full text searches in the main Google system, PageRank also helps a great deal.

2.1.1 Description of PageRank Calculation

Academic citation literature has been applied to the web, largely by counting citations or backlinks to a given page. This gives some approximation of a page's importance or quality. PageRank extends this idea by not counting links from alla pages equally, and by normalizing by the number of links on a page.

PageRank is Defined as Follows:

We assume page A has pages T1 . . . Tn which point to it (i.e., are citations). The parameter d is a damping factor which can be set between 0 and 1. We usually set d to 0.85. There are more details about d in the next section. Also C(A) is defined as the number of links going out of page A. The PageRank of a page A is given as follows:

$$PR(A)=(1-d)+d(PR(T1)/C(T1)+ \ldots +PR(Tn)/C(Tn))$$

Note that the PageRanks form a probability distribution over web pages, so the sum of all web pages' PageRanks will be one.

PageRank or PR(A) can be calculated using a simple iterative algorithm, and corresponds to the principal eigenvector of the normalized link matrix of the web. Also, a PageRank for 26 million web pages can be computed in a few hours on a medium size workstation. There are many other details which are beyond the scope of this paper.

2.1.2 Intuitive Justification

PageRank can be thought of as a model of user behavior. We assume there is a "random surfer" who is given a web page at random and keeps clicking on links, never hitting "back" but eventually gets bored and starts on another random page. The probability that the random surfer visits a page is its PageRank.

And, the d damping factor is the probability at each page the "random surfer" will get bored and request another random page. One important variation is to only add the damping factor d to a single page, or a group of pages. This allows for personalization and can make it nearly impossible to deliberately mislead the system in order to get a higher ranking. We have several other extensions to PageRank, again see [Page 98].

Another intuitive justification is that a page can have a high PageRank if there are many pages that point to it, or if there are some pages that point to it and have a high PageRank. Intuitively, pages that are well cited from many places around the web are worth looking at. Also, pages that have perhaps only one citation from something like the Yahoo! homepage are also generally worth looking at. If a page was not high quality, or was a broken link, it is quite likely that Yahoo's homepage would not link to it.

PageRank handles both these cases and everything in between by recursively propagating weights through the link structure of the web."

Thus, from the above-recited passages describing the Google search engine, it can be seen that the prior art teaches to calculate the random-walk-based probabilities of nodes for purpose of ranking pages. In contrast, the present invention uses the random-walk-based probabilities for purpose of calculating clusters of nodes.

Returning now to the present invention, we note that many of the component clusters found by the present invention's algorithm may be smaller than a user-defined threshold. Such clusters need to be merged into larger clusters, as discussed in step 230 of FIG. 2. This step is described in detail in FIG. 6. A user-defined threshold is utilized in order to define the minimum expected size of a cluster. All clusters for which the size is less than this user-defined threshold are merged with clusters for which the size is above a user-defined threshold. In each iteration, we determine all clusters for which the size of above a user-defined threshold, and we merge the smaller clusters with these larger clusters. Each smaller component is merged with a larger component with which it has the maximum number of connections.

Figure 6:
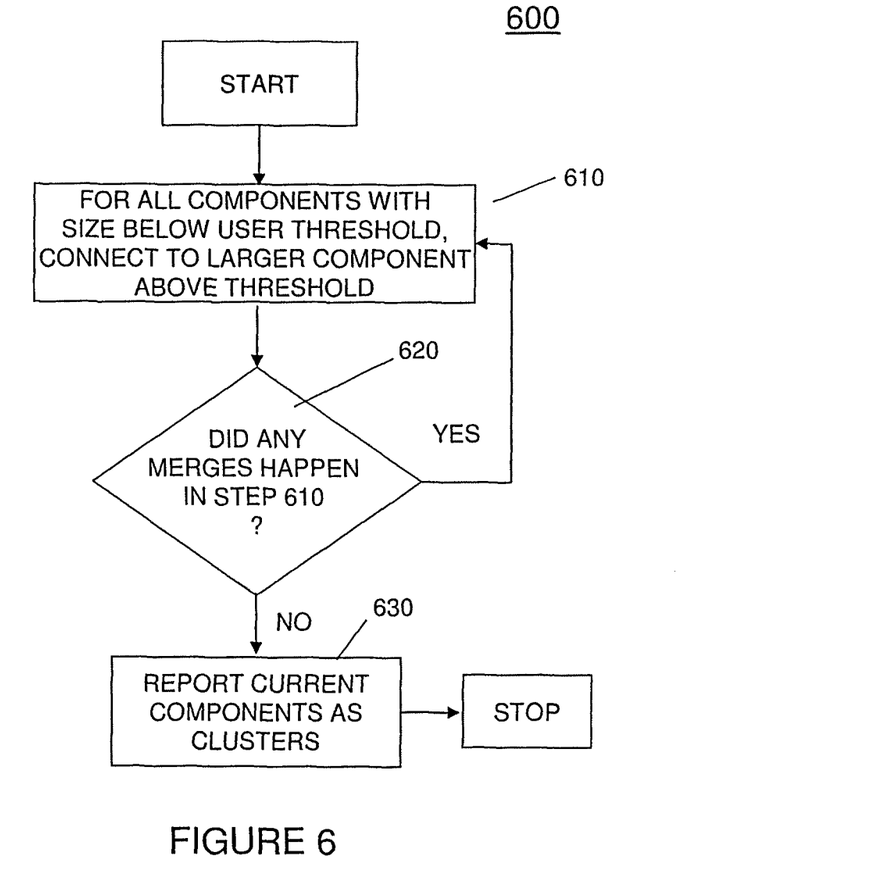
FIG. 6 is a detailed description in flowchart format 600 of the process of putting together the different density connected components as an exemplary detailed description of step 230 of FIG. 2.

This is performed in step 610. In step 620, we check if at least one merge did occur in the last iteration. If at least one merge did occur, we go back to step 610. Otherwise, we report the current components as relevant clusters in step 630, and terminate.

Exemplary Hardware Implementation

Figure 7:
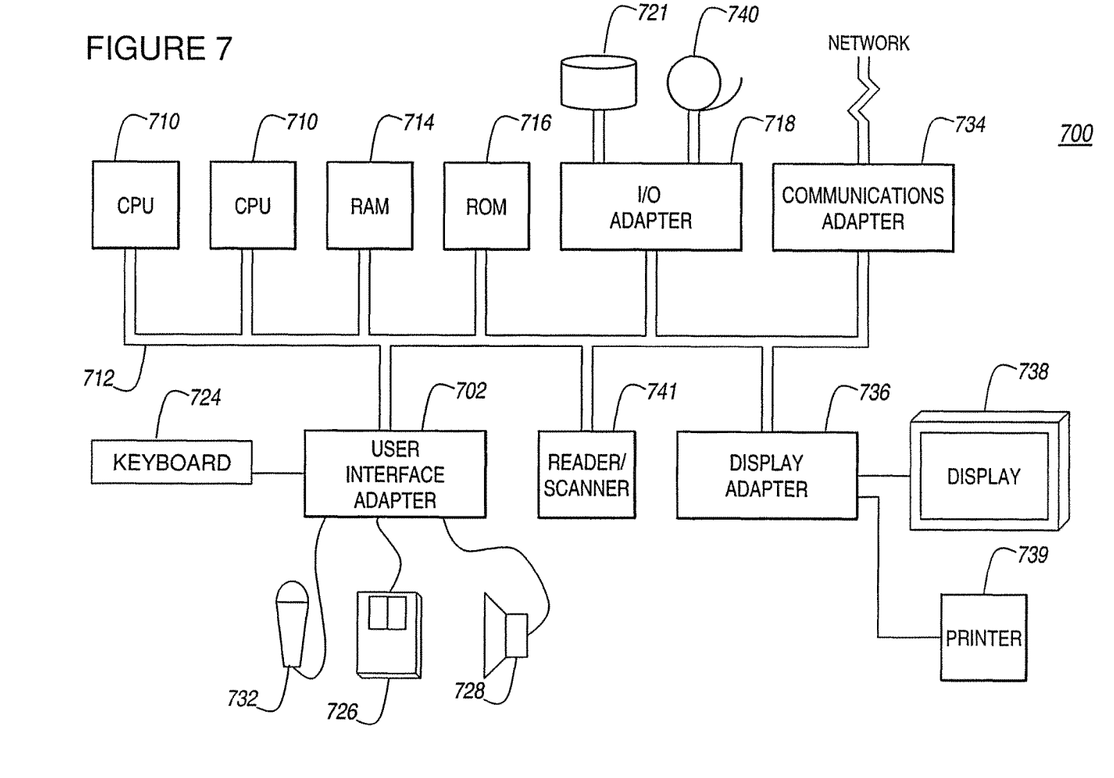
FIG. 7 illustrates an exemplary hardware/information handling system 700 for incorporating the present invention therein, such as the exemplary server 5 of FIG. 1.
Figure 8:
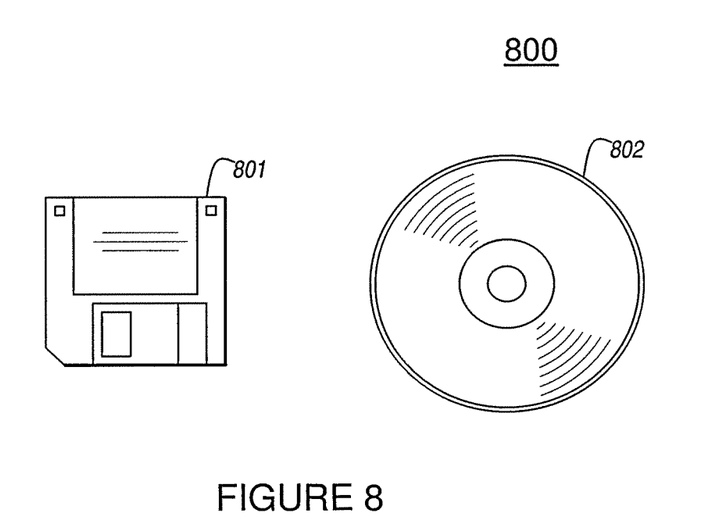
FIG. 8 illustrates a signal-bearing storage medium 800 (e.g., storage medium or memory device) for storing steps of a program of a method according to the present invention.

FIG. 7 illustrates a typical hardware configuration of an information handling/computer system in accordance with the invention and which preferably has at least one processor or central processing unit (CPU) 711.

The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, an Intranet, a personal area network (PAN), etc., and a display adapter 736 for connecting the bus 712 to a display device 738 and/or printer 739 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing storage media.

Thus, this aspect of the present invention is directed to a programmed product, comprising signal-bearing storage media tangibly embodying a program of machine-readable instructions executable by a digital data processor incorporating the CPU 711 and hardware above, to perform the method of the invention.

This signal-bearing storage media may include, for example, a RAM contained within the CPU 711, as represented by the fast-access storage for example. Alternatively, the instructions may be contained in another signal-bearing storage media, such as a magnetic data storage diskette 800 (FIG. 8), directly or indirectly accessible by the CPU 711.

Whether contained in the diskette 800, the computer/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing storage media including memory devices in transmission hardware, communication links, and wireless, and including different formats such as digital and analog. In an illustrative embodiment of the invention, the machine-readable instructions may comprise software object code.

As is readily apparent from the above description, the present invention discusses a new method for supervised network clustering which can be useful for constraining the nodes to belong to specific clusters. This is particularly useful in cases where prior knowledge is available for directing the clustering process.

Although the present invention has been described as an exemplary embodiment, it should be apparent that variations of this exemplary embodiment are possible and considered as included in the present invention.

For example, rather than using the server 5, the invention could also be implemented as a user-interactive application, in which the user interactively labels nodes as relevant to a particular group.

As another example of a possible modification, if desired, the user may even look at the output of the clustering and further modify the labels.

Therefore, it is noted that, Applicant's intent is to encompass equivalents of all claim elements, even if amended later during prosecution.

What is claimed is:

1. An apparatus, comprising:
a processor; and
a memory device, said memory device storing therein a set of machine-readable instructions permitting said processor to execute a method of supervised network clustering, said method comprising:
receiving and reading node labels from a plurality of nodes on a network, as executed by a processor on a computer having access to said network, said node labels comprising a set of keywords describing each node;
using said node labels to calculate a density for each node by using a random walk process as a measure of probability of traversing from said node to adjacent nodes in said network, to define densities associated with said nodes; and
iteratively extracting node cluster components from the network as network clusters, based on using thresholds on node densities, wherein a threshold for an iteration comprises an average density over all remaining nodes, wherein said threshold is user-defined and smaller-cluster components having a size less than a user-defined threshold value are merged with larger cluster components, wherein each smaller cluster component is merged to a cluster component with which it has a largest number of connections, the merging thereby reducing a noise in the network clustering and adapting the network clustering to local densities in said network.

2. The apparatus of claim 1, wherein a higher probability is interpreted as indicative that said node more likely is associated with a network cluster.

3. The apparatus of claim 2, wherein a restart vector associated with the random walk is defined on a basis of node labels.

4. The apparatus of claim 1, wherein density-connected nodes above a given threshold are determined as initial cluster components.

5. The apparatus of claim 4, wherein the density-connected nodes are defined as nodes between a path that exists in which all nodes have densities greater than the threshold.

6. The apparatus of claim 4, wherein said clustering is iterative and continues until no further merging of small clusters occurs.

7. The apparatus of claim 1, wherein said node labels are associated with different classes, wherein said random walk process includes a parameter that affects said random walk process, and wherein said random walk process parameter is selectively associated with different values for different classes of node labels, to thereby provide a supervision mechanism to said network clustering.

8. The apparatus of claim 1, wherein said random walk process derives a probability value based on a PageRank Algorithm.

9. A server comprising:
an input port to receive information concerning nodes on a network; and
a processor, wherein said processor:
receives, via said input port, and reads node labels from a plurality of nodes on the network, said network defined by a group of entities connected by links, said node labels comprising a set of keywords describing each node;
calculates a random-walk-based probability for each said node on said network, to define densities associated with said nodes; and defines clusters of nodes in said network based on said densities, wherein said clusters are extracted based on using a threshold value of said densities, wherein said threshold value initially comprises an average density of said network, wherein each node in said network is placed into one of said clusters, and wherein said cluster extraction comprises an iterative process, wherein said threshold value for each said iteration comprises an average density of remaining nodes across said network during that iteration;

merging smaller clusters with sizes below a user-defined threshold value, the merging thereby reducing a noise in the network clustering and adapting the network clustering to local densities in said network.

10. The server of claim 9, further comprising merging smaller clusters with sizes below a user-defined threshold value.

11. A computer, comprising:

A processor having access to a network, said network defined by a group of entities interconnected by links; and a memory device, said memory device storing a set of computer-readable instructions for said processor to execute an iterative method of clustering of said entities, said method comprising:

calculating a density associated with each said entity on said network, as executed by said processor; and defining clusters of entities in said network based on said densities, wherein further defining comprise a cluster extraction based on using a threshold value of said densities, wherein said threshold value initially comprises an average density of said network, wherein said densities are calculated as a random-walk-based probability for each said node on said network, corresponding to a PageRank computation on node labels of said nodes, said node labels comprising a set of keywords describing each node, and wherein said defining of clusters comprises an iterative process until all nodes of said plurality of nodes are included in a cluster of a predefined minimum cluster size, wherein said threshold value for each said iteration comprises an average density of remaining nodes across said network during that iteration;

merging smaller clusters with sizes below a user-defined threshold value, the merging thereby reducing a noise in the network clustering and adapting the network clustering to local densities in said network.

12. The computer of claim 11, wherein inputs to said processor for calculating said densities comprise links and labels for said nodes.

13. The computer of claim 11, wherein said clusters are merged, based upon a user-defined threshold.

* * * * *